United States Patent [19]
Roys et al.

[11] Patent Number: 5,835,372
[45] Date of Patent: Nov. 10, 1998

[54] INTEGRATED FLUID FLOW EVALUATION APPARATUS AND METHOD

[76] Inventors: Curtis Roys, 2603 Hodges, Midland, Tex. 79705; Larry L. Ritchie, 1300 N. Texas, Odessa, Tex. 79761

[21] Appl. No.: 528,865

[22] Filed: Sep. 15, 1995

[51] Int. Cl.$^6$ .................................................. G06F 19/00
[52] U.S. Cl. ................................ 364/140; 73/3; 73/14; 73/239
[58] Field of Search ..................... 364/140, 141, 364/142, 143, 144; 73/3, 14, 230, 240, 247, 248, 249, 250; 307/118

[56] References Cited

U.S. PATENT DOCUMENTS

| | | | |
|---|---|---|---|
| 3,564,277 | 2/1971 | Maguire | 307/106 |
| 4,043,198 | 8/1977 | Stillwell et al. | 73/242 |
| 4,419,880 | 12/1983 | Hanowich | 73/3 |
| 4,445,168 | 4/1984 | Petryszyn | 364/140 |
| 4,521,895 | 6/1985 | Wells | 377/21 |
| 4,536,660 | 8/1985 | Tetro | 307/118 |
| 4,674,030 | 6/1987 | Gabriel et al. | 364/184 |
| 4,811,001 | 3/1989 | Sweany | 340/671 |
| 5,182,720 | 1/1993 | Beck et al. | 364/509 |

*Primary Examiner*—Reba I. Elmore
*Assistant Examiner*—Thomas Brown
*Attorney, Agent, or Firm*—Fulbright & Jaworski L.L.P.; J. Scott Denko

[57] ABSTRACT

A microcontroller directed circuit evaluates volume flows through fluid distribution lines. The control circuit is integrated into a modularized housing designed to retro-fit standard fluid divider valve assemblies. The modular housing includes a plunger-driven magnet positioned to actuate a reed switch in response to divider valve piston reciprocation. The control circuit evaluates the frequency of reed switch actuation pulses to derive intelligible fluid flow related data available for RAM storage or conveyance to peripheral computer devices. In a preferred embodiment, a cavitated cylindrical housing contains a control circuit and a reed switch. A plunger acts as a lever arm to transmit the lateral oscillation of a fluid control piston within a divider valve assembly to a magnetic field source within the housing. As the reed switch is cyclically exposed to the activating field of the laterally oscillating magnet, resulting reed switch pulses are evaluated by a microcontroller directed circuit according to a selected software control program. Data may then be generated indicating total run time and fluid application frequency and total consumption. The control circuit may also produce alarm or shut-down signals to disable the industrial application if preselected fluid volume or frequency thresholds are violated.

14 Claims, 6 Drawing Sheets

INTEGRATED FLUID FLOW EVALUATION APPARATUS AND METHOD

TECHNICAL FIELD

The present invention relates to fluid distribution systems and, in particular, to apparatus and methods for integrated control of fluid lubrication systems.

BACKGROUND OF THE INVENTION

Inter-part friction reduction is a fundamental goal of industrial machine operation and design. Frictional forces may be reduced by injecting lubrication into critical bearing areas and reciprocating part junctions. Fluid lubrication is the most common technique of reducing friction between moving parts in an industrial tool.

A variety of systems are used to distribute lubrication in industrial machine applications. Generally, a lubrication distribution system is designed to dispense a pressurized oil supply to critical lubrication sites through a branched network of lubrication fluid lines. In a branched fluid distribution network, "divider valve" assemblies divide a known volumetric flow of inlet lubrication fluid into multiple volume-controlled output flows directed to particular lubrication sites in the industrial application. In a divider valve assembly, a laterally reciprocating fluid control piston cooperates with selected diameter orifices to articulate measured volumes of lubrication into branch distribution lines. Consequently, predictable amounts of lubrication fluid are applied to sites requiring lubrication.

Without lubrication, industrial tools and machines, such as compressors for example, can be seriously damaged or destroyed. Consequently, a variety of techniques have been developed to monitor system lubrication.

Prior art systems have proposed monitoring devices that deactivate the machine under lubrication in response to a detected lubrication fault. Simple monitoring devices connected to lubrication pressurization pumps can selectively provide pump failure warnings or may actively disable the system under lubrication. Pump monitors are inadequate, however, to indicate failure of branch lubrication distribution lines far from the pressurizing pump. For example, in U.S. Pat. No. 4,674,030 to Gabriel et al, low and high pressure sensors placed at terminal ends of a lubrication distribution system are used to monitor lubrication faults and purportedly deactivate the industrial tool under lubrication upon detection of a fault.

Other systems have been proposed to control the application of lubrication in relation to time or machine-cycle needs. For example, U.S. Pat. No. 4,445,168 to Petryszyn purportedly teaches a pump and reservoir monitoring time-based or cam-stroke dependent lubrication control system having status indicator lights. As a further example, U.S. Pat. No. 5,182,720 to Beck et al. teaches a microprocessor-based system that purportedly monitors thermistor resistance levels to deduce lubrication flows in branch lubrication lines.

Known prior systems have a number of disadvantages. Pump monitors can only inferentially discern distribution line conditions. Pressure sensitive systems are not easily adjustable for varying pressure threshold faults. Separate control assemblies complicate lubrication system installation and maintenance overhead while exposing raw data lines to environmental risks.

None of the known methods and systems achieve the required predictability and flexibility with straight-forward implementation at low cost. What is needed, therefore, is a compact and reliable apparatus and method for fluid distribution system control that is easily adaptable to existing lubrication systems with little expense and broad utility.

SUMMARY OF THE INVENTION

An object of the present invention is, therefore, to provide a method and apparatus for controlling fluid distribution systems.

Another object of the invention is to provide such a method and apparatus easily adapted to existing fluid distribution systems such as those used to distribute lubricating fluids to frictional sites on industrial applications.

A further object of the present invention is to provide such a method and apparatus at low cost and with simple articulation.

The present invention uses a microprocessor directed circuit to evaluate volume flows through fluid distribution lines. The control circuit is integrated into a modularized housing designed to retro-fit standard fluid divider valve assemblies. The modular housing includes a plunger-driven magnet positioned to actuate a reed switch in response to divider valve piston reciprocation. The control circuit evaluates the frequency of reed switch actuation pulses to derive intelligible fluid flow related data available for RAM storage or conveyance to peripheral computer devices.

In a preferred embodiment, a cavitated cylindrical structure contains a control circuit and a reed switch. A plunger acts as a lever arm to transmit the lateral oscillation of a fluid control piston within a divider valve assembly to a magnetic field source within the housing. As the reed switch is cyclically exposed to the activating field of the laterally oscillating magnetic field, resulting reed switch pulses are evaluated by a microcontroller directed circuit according to a selected software control program.

In one preferred embodiment, a lubrication system is directly scrutinized by a microcontroller directed circuit appended to a divider valve assembly in a fluid distribution system for a natural gas compressor. An end of a magnet housing is threaded into an end-plug orifice of a divider valve fluid piston chamber. A lever arm plunger transmits fluid piston motion to a spring biased magnetic field source within the magnet housing. The cavitated structure is sleeved over the plunger-magnet housing to selectively position an internal reed switch to be cyclically activated as the lateral movement of the reciprocating fluid control piston is transmitted to the moveable magnet by the lever arm plunger.

The oscillation frequency of the fluid piston is proportional to fluid volume flow. The lateral piston motion is transmitted through the lever arm to the magnetic field source. Therefore, as the magnetic field source cyclically activates the reed switch in tandem with piston motion, the reed switch activation frequency is proportional to fluid volume flow. The microcontroller circuit evaluates the reed switch pulse frequency and consequently, the fluid flow under scrutiny. Data may then be generated indicating total run time, lubrication frequency, and total lubricant consumption. The control circuit may also produce alarm or shut-down signals to disable the industrial application if preselected fluid volume or frequency thresholds are violated.

DETAILED DESCRIPTION OF PREFERRED EMBODIMENTS

Figure 1:
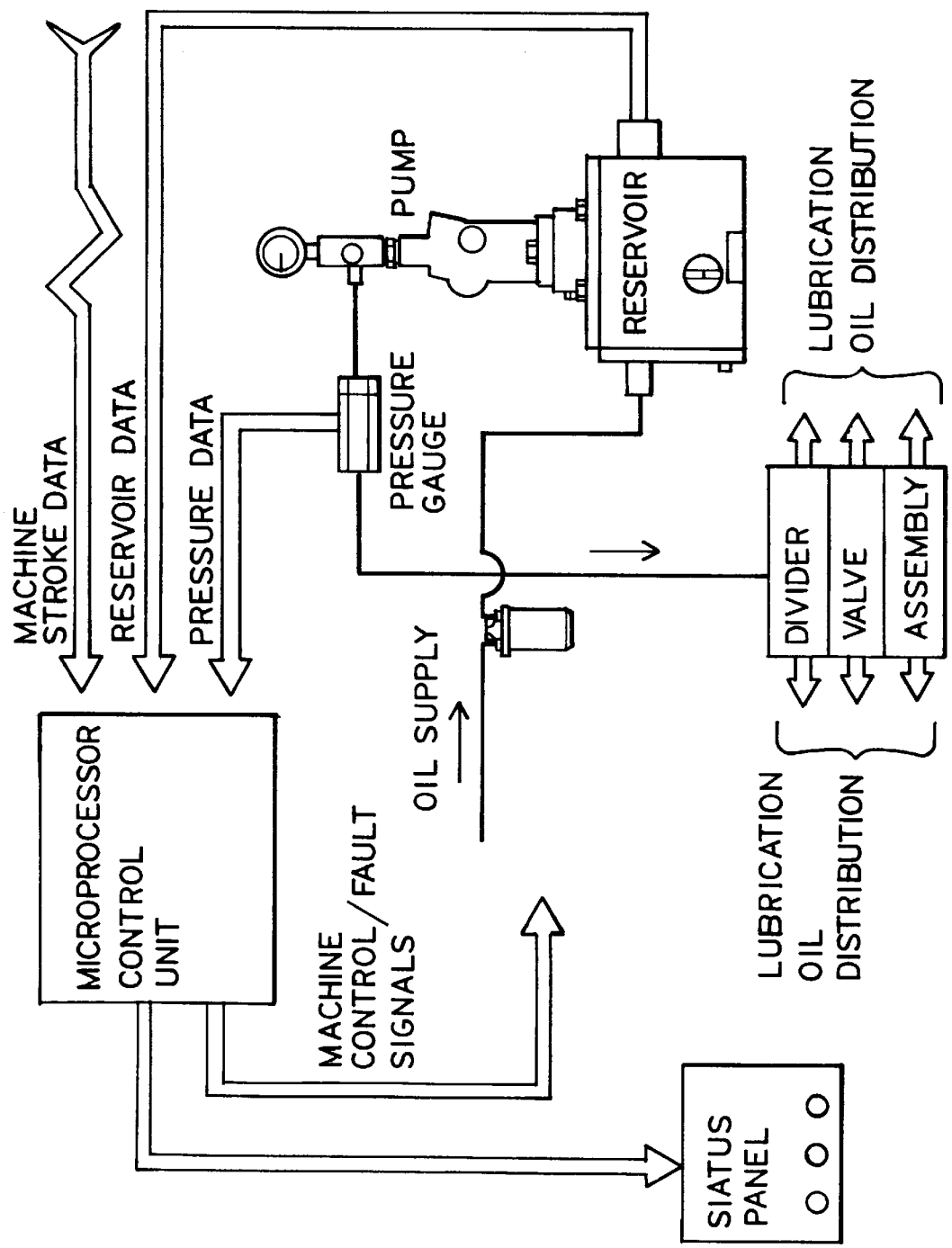
FIG. 1 is block diagram of a prior art lubrication monitoring system.

FIG. 1 is block diagram of a prior art monitoring system nominally designed for microprocessor control of a lubrication system. Inputs from a lubrication station indicate lubricant level and pressure and machine or lubrication system cycles. The microprocessor actuates the lubrication system on a periodic predetermined basis and generates fault signals. Status signals are indicated by a light panel.

Figure 2:
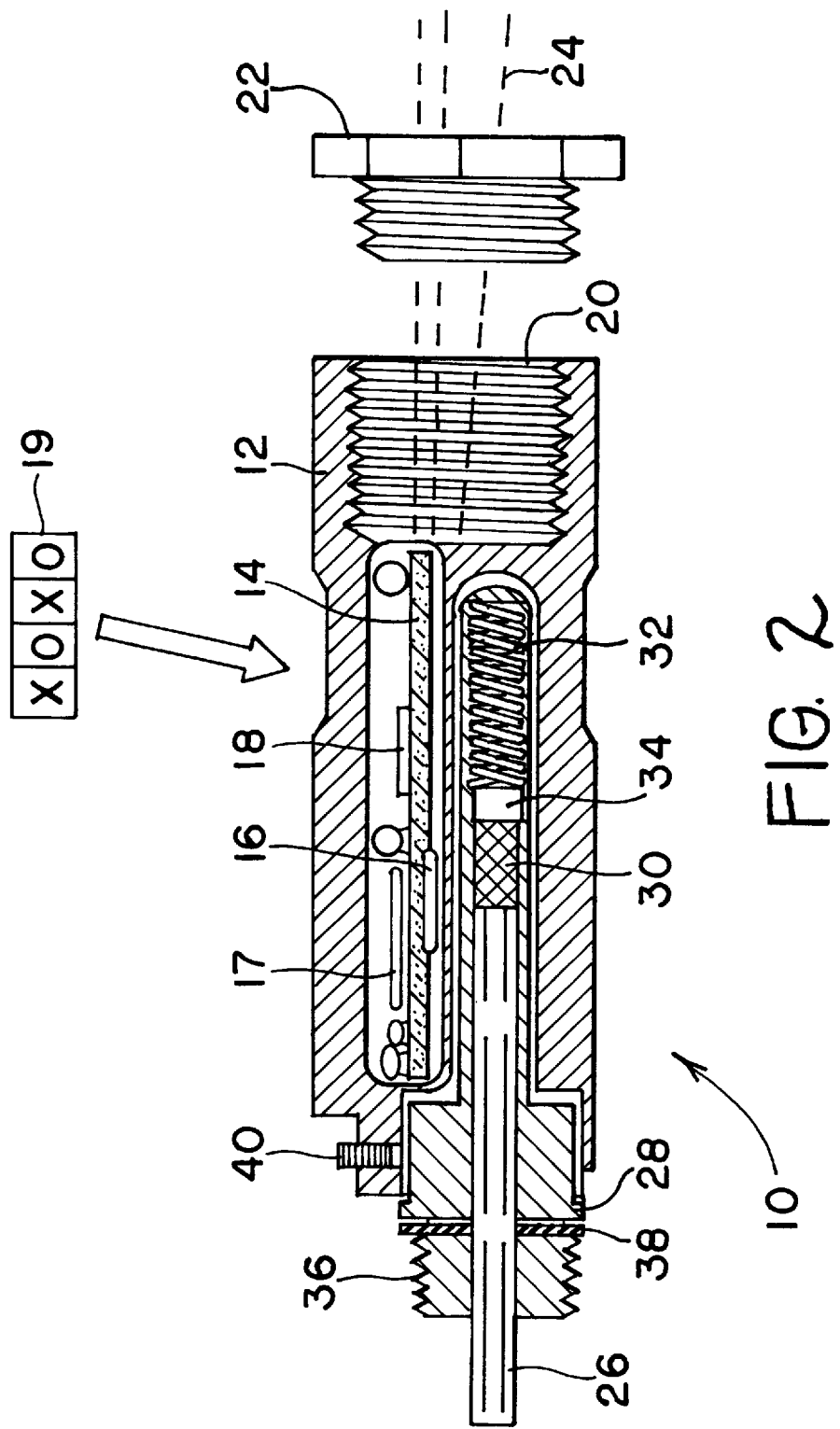
FIG. 2 is an internal view of a preferred embodiment of a fluid control device devised and directed in accordance with the present invention and adapted to retro-fit an existing lubrication control system.

FIG. 2 is an internal view of fluid control unit 10 depicting a preferred embodiment of the present invention designed for integrated use with existing lubrication distribution systems in industrial field applications. With reference to FIG. 2, cavitated housing structure 12 houses circuit board 14 and reed switch 16. In unit 10, microprocessor 18 resides on board 14 and controls data collection and evaluation. Microprocessor 18 provides data signals storable on-board microprocessor 18 or, optionally, in a separate RAM storage element 17. Microprocessor 18 may optionally also provide selective data displayable on optional LED digital display 19 shown in FIG. 2 as mountable on a flat surface of structure 12. Microprocessor 18 stores interpreted data and provides control signals available for monitored equipment shutdown. Cavity area 20 of structure 12 is female threaded to accept an appropriately threaded end plug 22 to seal unit 10 from elemental hazards. Control and data lines 24 may be extended through end plug 22 to provide automatic equipment shut down and data signals derived from microprocessor 18 for centralized control panel direction of unit 10.

Opposite area 20, magnetic plunger 26 is emergent from magnet housing 28. Cavitated housing 12 is sleeved over magnet housing 28 to provide a slidably adjustable relationship between reed switch 16 and the activating magnetic field source within magnet housing 28. Alternatively, plunger 26 may also be non-magnetic and provide a lever arm to transmit lateral motion to an optional separate magnet 30 laterally moveable within magnet housing 28. Plunger 26, in the case of a magnetized plunger, or the optional plunger-magnet combination, is tension biased with spring 32. Spacer 34 is placed between spring 32 and the slidable elements within magnet housing 28.

Figure 3:
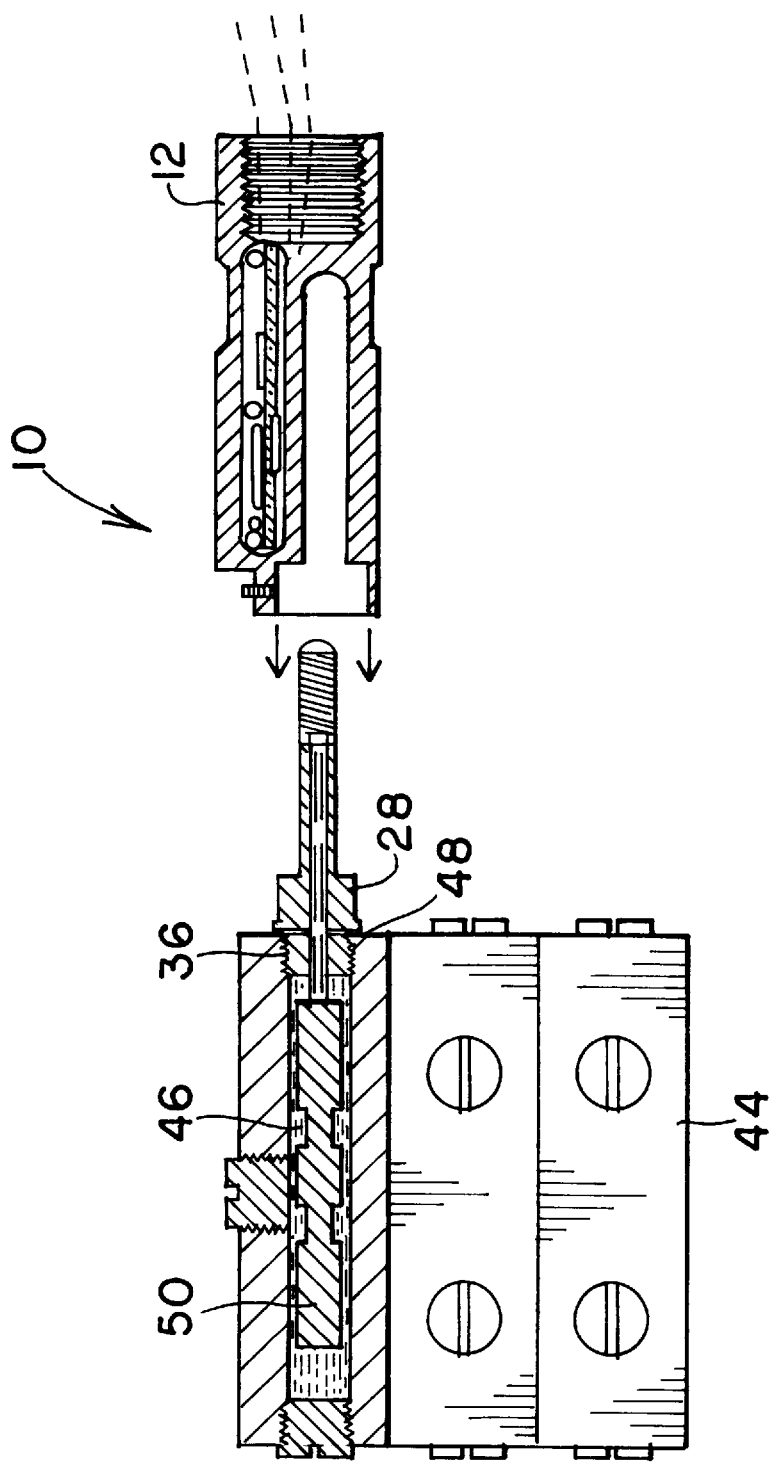
FIG. 3 depicts the integration of an apparatus devised and controlled in accordance with the present invention and a standardized divider valve assembly suitable for use in a branch lubrication distribution control system.

In the preferred embodiment depicted in FIG. 2, magnet housing 28 is male threaded around end area 36 to match the female threading of an end-plug orifice of a standardized divider valve assembly. O-ring 38 seals the juncture of unit 10 with the divider valve assembly. FIG. 3 depicts unit 10 as appended to the standardized divider valve assembly through the threaded fit between area 36 and the divider valve end-plug orifice.

Proper operation of magnetically actuated reed switches generally requires adjustment between reed switch and actuating magnet. With continued reference to FIG. 2, proper magnet-reed switch adjustment is provided by the slidable fit between magnet housing 28 and cavitated housing structure 12. When, through on-site adjustment or close control of operational parameters, magnet housing 28 is positioned for proper operation relative to structure 12, magnet housing 28 is fixed in place with set screw 40.

FIG. 3 depicts unit 10 as appended to a standardized divider valve assembly 44 through the threaded fit between area 36 and the divider valve piston chamber 46 end-plug orifice 48. When area 36 of magnet housing 28 is threaded into assembly 44, plunger 26 emerges from area 36 of housing 28 into a fluid control piston chamber 46 to contact piston 50. As depicted in FIG. 3, cavitated housing 12 is sleeved over magnet housing 28 to position the magnetic field source in appropriate proximity to reed switch 16 within cavitated housing 12. As piston 50 cyclically shuttles in bilateral motion in chamber 46 to controllably induce fluid flow into a lubrication distribution line, plunger 26 cyclically shuttles in magnet housing 28 in bilateral motion coincident with piston 50. As plunger 26 cyclically exposes reed switch 16 to the magnetic field source (i.e. the end of plunger 26 or optionally, separate magnet 30), reed switch 16 is actuated in cyclical sympathy with the oscillation of piston 50. Therefore, the measured fluid flow through the distribution line controlled from chamber 46 of assembly 44 is determinable from the pulse frequency of switch 16.

Figure 4:
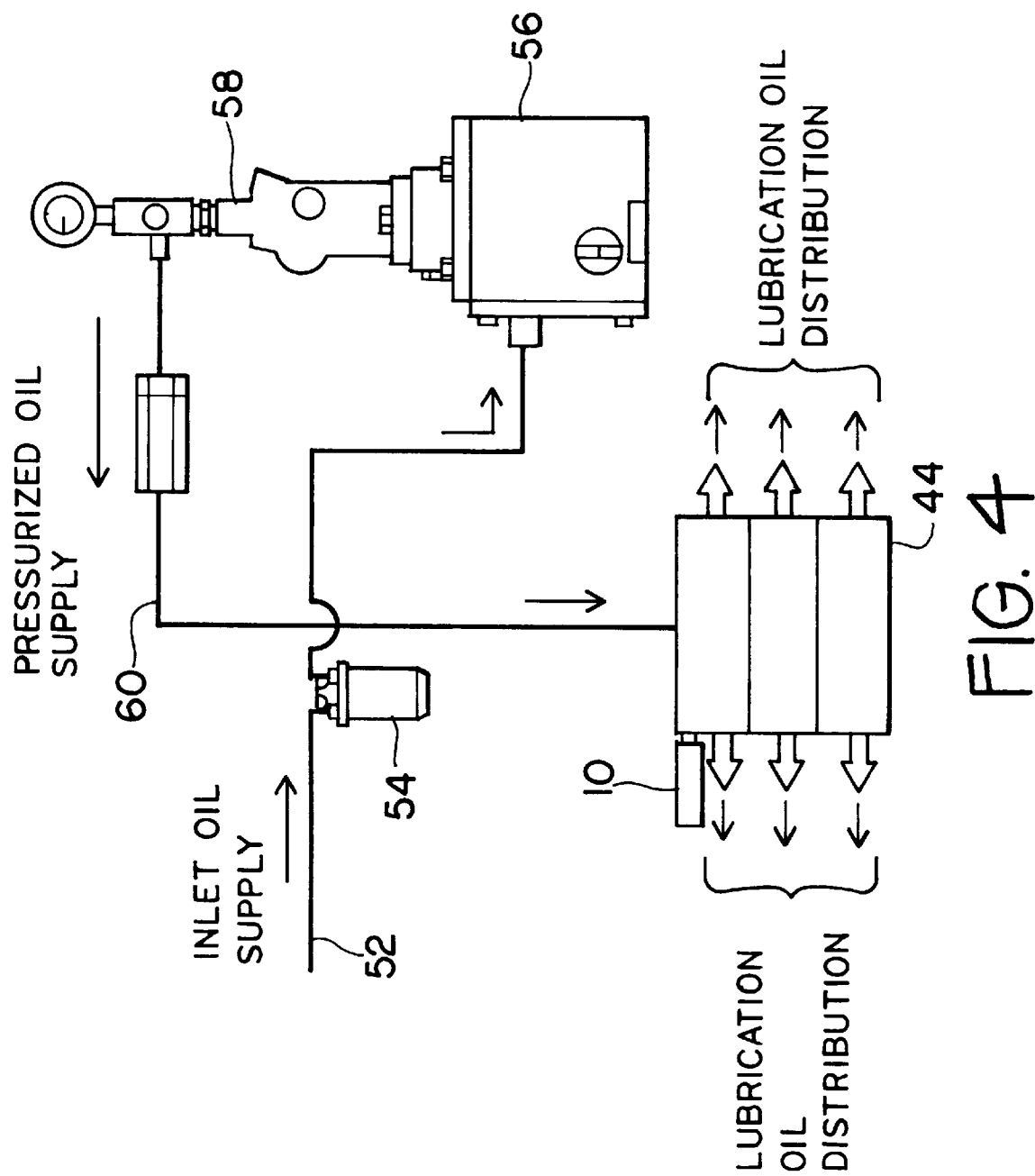
FIG. 4 depicts a lubrication distribution control system in accordance with the present invention.

FIG. 4 depicts unit 10 as might be installed in a natural gas compressor lubrication application. As shown in FIG. 4, an inlet oil supply conveyed along oil line 52 passes through oil filter 54 to reservoir 56. The lubrication oil is pressurized by pump 58 and conveyed to divider assembly 44 by line 60. As shown in FIG. 4, unit 10 is appended to divider assembly 44 to monitor lubrication flow from the upper chamber of assembly 44.

Unit 10 devices may be used to advantage on multiple chambers of assembly 44. As those skilled in the art will recognize, unit 10 is a preferred embodiment of the disclosed invention, and a variety of apparatus devised in accordance with the present invention may be used for compact and robust monitoring applications wherever fluid flows are distributed through piston articulated divider valve assemblies. Divider assemblies depicted throughout the present figures by reference numeral 44 are an example of piston articulated divider assemblies commonly found in fluid lubrication systems.

Figure 5:
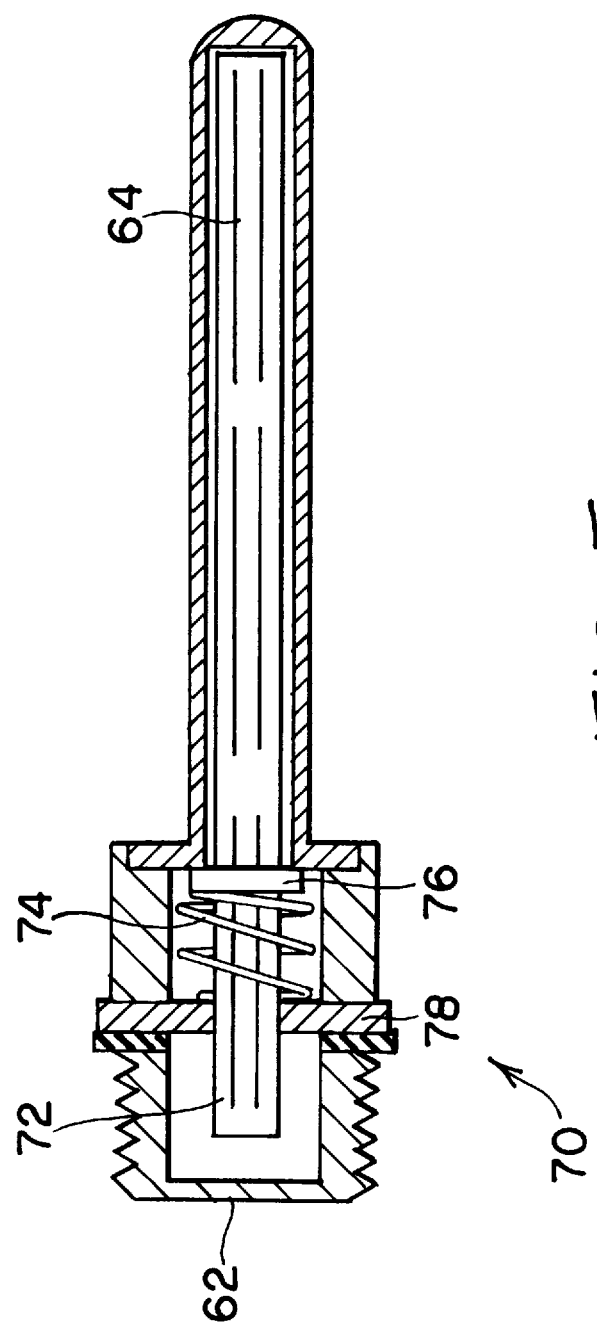
FIG. 5 is an internal view of an enclosed magnet assembly suitable for use in an apparatus devised in accordance with the present invention.

FIG. 5 is an internal view of an enclosed magnet housing and assembly 70 suitable for use in an apparatus devised in accordance with the present invention. With reference to FIGS. 2 and 3, when magnet housing 28 is threaded onto divider valve assembly 44, plunger 26 emerges from housing 28 into chamber 46. In highly sensitive applications, there may be reasons to avoid invasion of chamber 46 with plunger 26. The volume of plunger 26 may minutely modify the volumetric flow through chamber 46. The introduction of an opened path into chamber 46 may introduce contaminates into lubrication fluids passing through chamber 46. Consequently, the alternative preferred embodiment depicted in FIG. 5 uses a fully enclosed magnet housing and assembly 70 to provide a fully sealed intersection between unit 10 and assembly 44.

Like magnet housing 28, sealed assembly 70 is threaded for insertion into assembly 44 and dimensioned to be sleeved within cavitated structure 12. However, unlike housing 28, a plunger does not emerge from assembly 70. A magnetic plunger 72 within assembly 70 is biased by tension from spring 74 pushing against collars 76 and 78. When assembly 70 is appended to assembly 44, threaded end area 62 is positioned at an end of chamber 46 in an end plug orifice. As piston 50 laterally cycles fluid through chamber 46, piston 50 approaches and recedes from end area 62 of assembly 70. When, during its stroke, piston 50 is proximal end area 62, magnetic plunger 72 is drawn toward cyclically moving piston 50. When piston 50 approaches end area 62, the magnetic attraction between plunger 72 and piston 50 causes plunger 72 to laterally move against the bias of spring 74 thus moving the opposite magnetic field source end 64 of plunger 72. Consequently, magnetic field source end 64 of plunger 72 cyclically actuates reed switch 16 proximally located in surrounding cavitated structure 12. Reed switch 16 is actuated, therefore, in cyclical coincidence with controlled volumetric fluid flow through divider valve assembly 44. As with other embodiments, the cyclical actuation of reed switch 16 is evaluated by microprocessor 18 affixed to cavitated structure 12.

Figure 6:
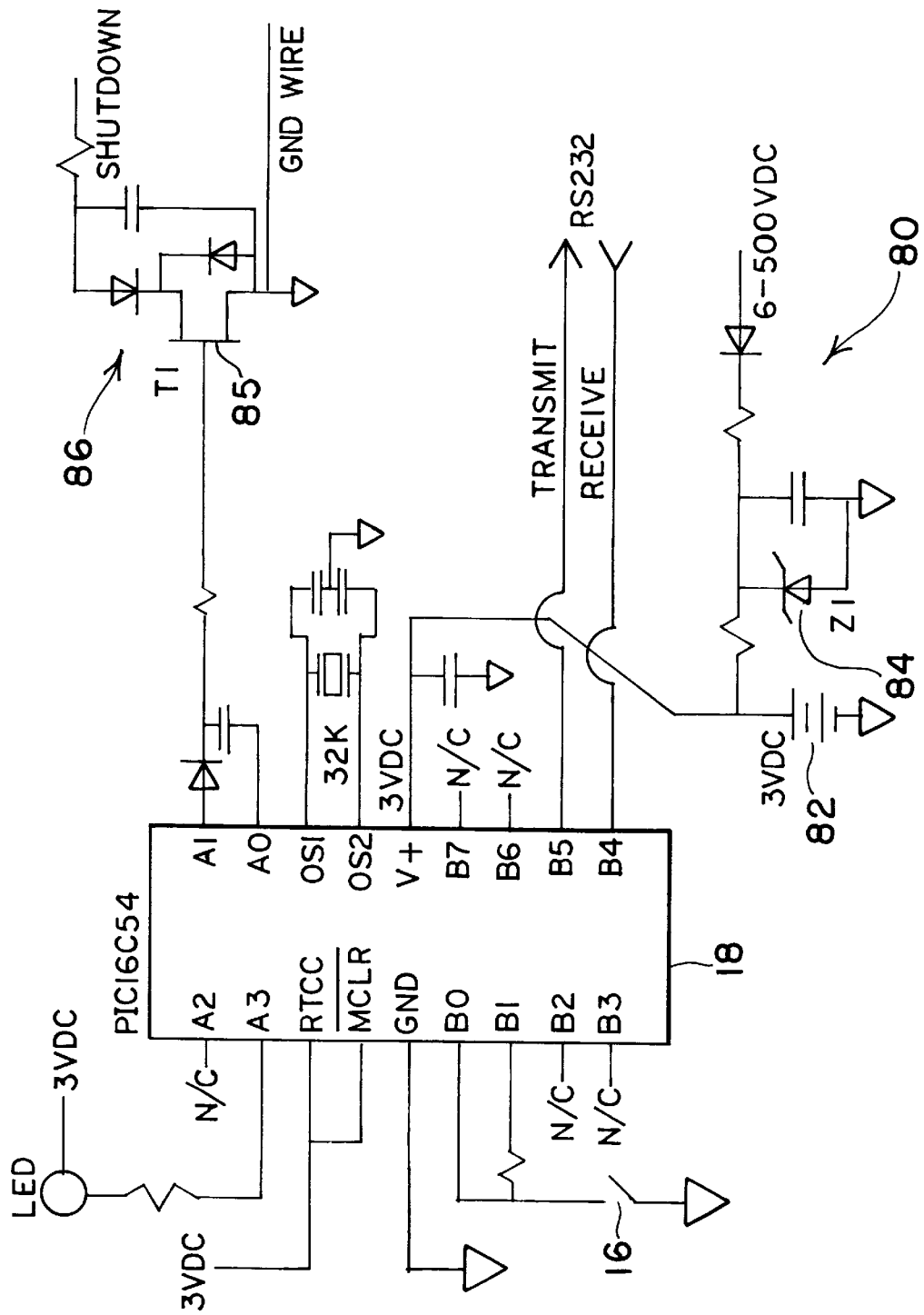
FIG. 6 is a schematic diagram of a control circuit adapted for use in a preferred embodiment of this invention.

FIG. 6 is a schematic diagram of a preferred control circuit 80 appropriate for use in unit 10. In a preferred embodiment, microprocessor 18 is a 20 Megahertz PIC16C54 from Microchip Technology Incorporated having 512 words of EEPROM program memory and 25 bytes of RAM data capacity. However, as those skilled in the art recognize, any typical microcontroller or microprocessor may be used as microprocessor 18 in circuit 80. Preferably, microprocessor 18 would include an on-board RAM capability to simplify storage of evaluated data.

Reed switch 16 is connected between ground and pins B0 and B1 of Port B. As explained above, reed switch 16 is cyclically activated by lateral motion of a magnetic field source within unit 10. As reed switch 16 is toggled, microprocessor 18 aggregates and evaluates the pulses from switch 16. Intelligible data such as total run-time and fluid flow rates can be determined by microprocessor 18 in evaluation of switch 16 pulse rates and totals. That aggregated data may then be compared to preselected thresholds programmed into microprocessor 18 to precipitate appropriate control signals.

In a preferred embodiment, circuit 80 is devised for free-standing field site use in unit 10. Power is supplied by a lithium battery 82 and data is stored in RAM on-board microprocessor 18 until communicated through Port B pins B5 and B4 in a signal protocol conditioned for RS232 compliant communication. Consequently, field maintenance personnel may periodically download stored data from unit 10.

However, circuit 80 includes features to adapt unit 10 for central control panel direction of one or more unit 10 devices. As shown in FIG. 6, circuit 80 includes a wide range DC input capability conditioned by Zener diode 84 (Z1). In a preferred embodiment, Z1 is a 5.1 volt Zener, but any appropriate breakdown diode may be used to provide power at an appropriate DC voltage level from a source removed from unit 10. If large amounts of data are collected, the Port B data access may be used to collect data in a large capacity serial memory unit located on unit 10 and shown in FIG. 2 at reference numeral 17, or alternatively, in a peripheral computer or control panel for direct centralized access to data.

In continuing reference to FIG. 6, when preselected control program thresholds are transgressed, circuit 80 determines that a lubrication related fault has occurred and Port A is used to change the state of transistor 85 (T1). As shown in FIG. 6, in a preferred embodiment, a diode and capacitor combination is used as a charge pump sub-circuit 86 to increase the switching voltage across T1 85. This allows a preferred embodiment to use a hexfet transistor such as IRF820 to control the state of the shut-down signal and therefore, provide a more definitive signal. However, any switching transistor may be used as T1 85.

The shut-down signal may be devised for either active LOW or active HIGH application use. In a preferred embodiment, a fail-safe mode is provide by holding the shut-down signal LOW by maintaining the gate of T1 85 HIGH. This allows circuit 80 to signal its own loss of power when the bias to the gate of T1 85 is lost. Loss of gate bias on T1 85 causes the shut-down signal to go towards HIGH and indicate a fault in unit 10 itself. Consequently, with shut-down actively held LOW, a fault in either the lubrication system or unit 10 may therefore, be signalled.

A preferred program appropriate for use in controlling circuit 80 and unit 10 with microprocessor 18 is provided and made part of this application. Other programs appropriate for the demands of other service applications and fluid systems may be used to advantage in circuit 80 and unit 10 in accordance with the present invention.

It will be obvious to those having skill in the art that many changes may be made in the above-described details of a preferred embodiment of the present invention without departing from the underlying principles thereof. The scope of the present invention should, therefore, be determined only by the following claims.

We claim:

1. A fluid-flow machine control signalling apparatus adapted for appendage to a divider valve for evaluation of a selected fluid flow through the divider valve, the apparatus comprising:

a cavitated apparatus protection structure adapted for appendage of the protection structure to a divider valve;

an evaluation circuit disposed within said protection structure and adapted to provide intelligible control data;

a lever arm plunger having a magnetic first plunger end disposed in a cavity of the protection structure, the lever arm plunger being partially emergent from the protection structure and projectable into the divider valve to contact at a second plunger end, a piston of the divider valve to transfer motion of the piston of the divider valve to the magnetic first plunger end disposed in the structure by reciprocation of the piston against the second plunger end and consequent reciprocation in the cavity of the magnetic first plunger end; and a switch disposed within said protection structure to selectively respond to movement of the magnetic first plunger end with an output signal provided to said evaluation circuit.

2. The apparatus of claim 1 in which the evaluation circuit is controlled with a microprocessor and produces a shut-down control data signal upon violation of a preselected criteria.

3. The apparatus of claim 1 further comprising a magnetic field source housing adapted to append the fluid-flow machine control apparatus to the divider valve and in which the magnetic first plunger end of the lever arm plunger is disposed, said housing being sleeved into said cavity of the cavitated protection structure.

4. The apparatus of claim 3 wherein the lever arm plunger is sealed within said magnetic field source housing.

5. The apparatus of claim 3 wherein the lever arm plunger has a primary end disposed within the housing to move a separate magnetic field source within said housing and a secondary end of the lever arm plunger is disposed against the piston of the divider valve to convey motion of the piston of the divider valve to the magnetic field source within the magnetic field source housing.

6. The apparatus of claim 1 further comprising a display articulating a selected set of said intelligible control data.

7. A method for deriving data related to a selected fluid flow through a divider valve in a fluid distribution system, said method comprising the steps of:

providing a cavitated structure;

disposing a microprocessor-directed circuit within said structure;

positioning a moveable lever arm plunger having a magnetic first end to place the magnetic first end within a cavity of said structure;

positioning a switch within said structure to generate switch signals responsive to motion of said magnetic first end in said cavity;

conveying a motion representative of said selected fluid flow through a divider valve to said magnetic first end of the lever arm plunger by placement of a second end of the lever arm plunger against a reciprocal fluid-responsive piston of the divider valve to cyclically move the magnetic first end of the lever arm plunger in the cavity of the structure in response to motion of the piston of the divider valve to generate said switch signals;

evaluating said switch signals with said microprocessor directed circuit to derive intelligible selected fluid flow-related data.

8. The method of claim 7 in which said intelligible selected fluid flow-related data is stored in a random access memory site and available for downloading by a peripheral computer system.

9. A method for deriving data indicative of a selected fluid flow through a divider valve, said method comprising the steps of:

providing a pressurized fluid flow to a divider valve chamber;

cyclically transposing a piston within said divider valve chamber to articulate a predetermined volume of fluid through said chamber;

appending a cavitated structure to the divider valve;

disposing a microprocessor-directed evaluation circuit substantially within said structure;

positioning a moveable magnetic field source within a cavity of said structure;

positioning a switch within said structure to generate actuation signals responsive to motion of said moveable magnetic field source;

transferring motion of said piston in the divider valve chamber to said moveable magnetic field source within the cavity of the structure with a lever arm plunger disposed at a first end to move the moveable magnetic field source in the structure and at a second end against the piston of the divider valve to generate said actuation signals;

evaluating said actuation signals with said microprocessor-directed circuit to derive data indicative of the selected fluid flow through the divider valve.

10. A method of evaluating a fluid distribution system, said method comprising the steps of:

providing a pressurized fluid flow to a chamber;

cyclically transposing a piston within said chamber to articulate a predetermined volume of fluid through said chamber;

appending to the chamber, a cavitated structure bearing within, an evaluation circuit responsive to the motion of the piston through lever arm transference of the motion of the piston in the chamber to a magnetic field source within the structure provided by a lever arm having a magnetic first end disposed in the structure and a second end disposed against the piston of the chamber, the magnetic field source provided by the magnetic first end of the lever arm being stimulative of a magnetically-responsive switch whose signals are evaluated by the evaluation circuit to provide signals indicative of the pressurized fluid flow in the chamber.

11. A fluid-flow machine control signalling apparatus for evaluating a selected fluid flow in a divider valve, the apparatus comprising:

a cavitated apparatus protection structure;

an evaluation circuit disposed within the protection structure and adapted to provide intelligible machine control data;

a magnetic field source housing selectably positioned in the protection structure and having a magnetic field source-receptive well providing a motion field for a magnetic field source, the housing being adapted for appendage to the divider valve;

a magnetic field source disposed in the well of the housing, the magnetic field source being moveable in sympathy with a selected fluid flow through the divider valve through lever arm transference of motion from a piston disposed within the divider valve to the magnetic filed source disposed within the cavitated protection structure by a lever arm plunger disposed at a first end against the magnetic field source and at a second end against the piston;

a magnetically-responsive switch disposed within the cavitated apparatus protection structure to selectively respond to the sympathetic movement of the magnetic field source with an output signal provided to the evaluation circuit.

12. The apparatus of claim 1 wherein the evaluation circuit includes a memory site from which may be retrieved said intelligible control data.

13. The apparatus of claim 1 further comprising a display articulating a selected set of intelligible control data.

14. The method of claim 10 further comprising the step of providing a display for indication of the signals indicative of the pressurized fluid flow in the chamber.

* * * * *